United States Patent [19]
Kren et al.

[11] 4,285,053
[45] Aug. 18, 1981

[54] ACOUSTIC METHOD AND APPARATUS FOR MEASURING MICRON AND SUBMICRON DISTANCES

[75] Inventors: George J. Kren, Los Altos; Franklin R. Koenig, Palo Alto, both of Calif.

[73] Assignee: Tencor Instruments, Mountain View, Calif.

[21] Appl. No.: 40,930

[22] Filed: May 21, 1979

[51] Int. Cl.³ .............................................. G01S 15/32
[52] U.S. Cl. ...................................... 367/99; 73/596; 367/114
[58] Field of Search .................. 367/114, 99; 73/596, 73/597, 598, 599

[56] References Cited

U.S. PATENT DOCUMENTS

| | | | |
|---|---|---|---|
| 2,268,643 | 1/1942 | Crosby | 367/101 |
| 2,913,700 | 11/1959 | Brody | 367/114 |
| 2,985,018 | 5/1961 | Williams | 367/114 |
| 3,500,301 | 3/1970 | Meier | 367/99 |
| 3,694,800 | 9/1972 | Frank | 367/114 |
| 3,918,296 | 11/1975 | Kitada | 73/67.7 |
| 4,175,441 | 11/1979 | Urbanek et al. | 73/599 |

Primary Examiner—Richard A. Farley
Attorney, Agent, or Firm—Thomas Schneck

[57] ABSTRACT

A gauge for measuring variations in distance of a surface relative to a reference by means of phase shifts in a zone of high acoustic impedance. A gauge head is provided with a first orifice for emitting acoustic waves, driven by a reference signal, toward a surface positioned very close to the gauge head, forming a high impedance zone. A second orifice in the gauge head picks up acoustic waves subjected to the zone and these waves are converted to electrical signals for comparison to the reference signal in a phase detector. The phase error between the two signals is indicative of surface distance variations.

8 Claims, 10 Drawing Figures

ACOUSTIC METHOD AND APPARATUS FOR MEASURING MICRON AND SUBMICRON DISTANCES

BACKGROUND OF THE INVENTION a. Field of the Invention

The invention relates to acoustic distance measuring gauges, and more particularly to an acoustic method and apparatus for measuring extremely small distances between a gauge head and a surface.

b. Prior Art

Acoustic distance gauges are known. Some rely on pulse-echo measurement, others rely on acoustic pressure. An example of a pulse-echo gauge relying on the magnitude of reflected signals for use in thickness measurements, is in U.S. Pat No. 3,918,296, while examples of pulse-echo gauges relying on phase shift may be found in U.S. Pat. No. 2,268,643 to Crosby and U.S. Pat. No. 3,500,301 to Meier. An example of a distance gauge relying on acoustic pressure may be found in U.S. Pat. No. 4,175,441 Urbanek, Kren and Wheeler.

With regard to the aforementioned Meier patent, ultrasonic waves are transmitted from a source to a target web where the waves are reflected back to a receiver. Variations in phase of the returned waves indicate distance to an object. Meier teaches that the minimum sonic path length between transducers and the target web should be at least four wavelengths, lest non-linearities due to sonic near-field effects become too severe. Using an operating frequency for ultrasonic waves of 40 kHz, Meier is able to detect unique path length changes within one-half of a wavelength, or 0.165 inches in air at 80° F.

Crosby teaches use of a distance finder wherein phase changes for waves reflected from a target of different frequencies, primarily radio frequencies, are combined. The amplitude off the resultant is indicative of distance to a target. While Crosby deals with less than one wavelength in an example relating to radio frequencies, he suggests path lengths of plural wavelengths for sound waves.

While these prior art distance gauges are useful, there is a need for a non-contacting distance gauge which can measure variations in distance of a micron and less. Such measurements are needed for checking flatness of optical components, semiconductor wafers, and the like.

SUMMARY OF THE INVENTION

The present invention measures micron and submicron differences in distances by measuring phase shifts of acoustic waves which are very long compared to an acoustic path between a wave source, a reflective target and a receiver. A source and a receiver of acoustic waves are placed very close to, almost in contact with, a surface the distance to which is to be measured, for example, for measuring flatness. This close spacing creates an acoustic wave path having high acoustic impedance. The phase of received waves from this high impedance is compared with the phase of a reference having a known phase relation to transmitted waves. The phase difference, or error, has been found to be linearly proportional to distance over a range of at least 60 microns.

An advantage of the present invention is that it can measure micron size distances to an accuracy of better than one-tenth of a micron. Another advantage is that the gauge is practically immune to acoustic noise from outside of the gauge head.

DESCRIPTION OF THE PREFERRED EMBODIMENT

The preferred acoustic wave transducer or gauge head for use in the present invention was the subject of patent application Ser. No. 903,493 by Urbanek, Kren and Wheeler, filed May 8, 1978. Although the transducer was used to measure acoustic wave amplitude in that application, a very similar transducer, with different signal processing electrical circuits can be used for acoustic wave phase measurements. Before describing those electrical circuits, a review of the gauge head configuration is helpful.

Figure 1:
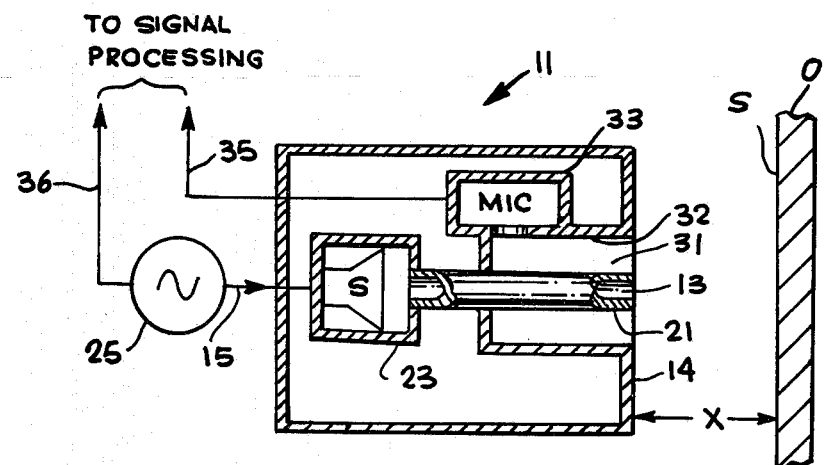
FIG. 1 is a plan view of a known type of acoustic gauge head used in the present invention.

With reference to FIG. 1, a plan view of a gauge head 11 used in the distance gauge of the present invention is shown. The head is preferably cylindrical having two orifices 13, 31 on one end and electrical leads 15, 35 emerging from the rear of the head, although the electrical leads may emerge from any side of the head. In the preferred embodiment, the gauge head has a length of approximately 30 mm and a diameter of approximately 22 mm. These dimensions are exemplary. The dimensions selected by a user should be large enough to accommodate the components of FIG. 1 described below, although the components could be located outside of the gauge head if an especially small head is required.

The first orifice 13 is an acoustic wave modulation output located at the end of a conduit or tube 21 which extends from the orifice 13 to a miniature speaker 23. Miniature speaker 23 is a commercially available device measuring approximately 10 mm on a side and approximately 4 mm thick. The speaker is commercially known as a receiver, model BB-1511 available from Knowles Electronics, Inc., Franklin Park, Ill. Speaker 23 is electrically driven by a low power solid state audio oscillator 25 which is connected to speaker 23 by means of a wire pair 15. The frequency of audio oscillator 25 is not critical, but a frequency below 20,000 Hertz is preferred. The exact frequency selected should be one which yields an optimum signal to noise ratio for the entire system, taking into account the sensitivity of an acoustic pickup transducer described below. Orifice 13 is parallel to, but spaced from, a planar surface, S, of an object, O, such as a substrate. Typically, the substrate may be supported by a block or table, not shown.

Figure 2:
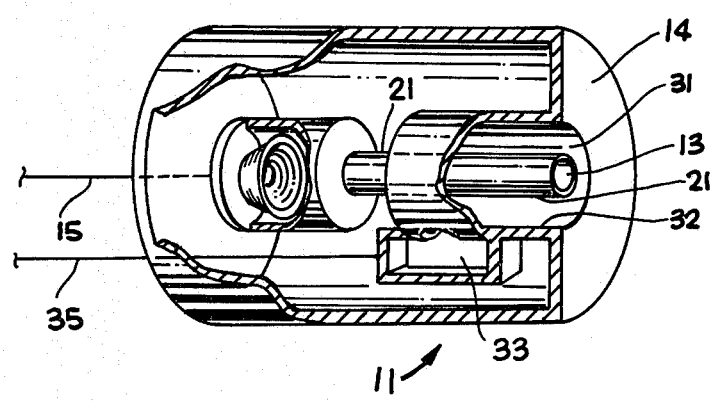
FIG. 2 is a side sectional view of the gauge head of FIG. 1.

The gauge head 11 preferably has a face 14 which is a panel or wall having the orifices 13, 31 defined therein. In FIGS. 1 and 2 face 14 is shown to be annular with orifices 13, 31 defined coaxially in the center thereof. Examplary dimensions for gauge demensions are as follows. Head 11 is made cylindrical with a face diameter of 6.4 mm, a first orifice 13 diameter of 0.8 mm surrounded by conduit 21 having a diameter of 1.1 mm. Second orifice 31 coaxially surrounds first orifice 13 and has a diameter of 1.6 mm. These dimensions may be varied by those skilled in the art and are not critical.

Second orifice 31 is an acoustic wave input which communicates with the sensitive portion of a microphone 33 through a conduit or tube 32. Microphone 33 is approximately the same size as speaker 23. Such a microminiature microphone is also available from the same supplier mentioned above and has a commercial designation of BA 1502. A pair of wires 35 emerging from microphone 33 is connected to signal processing means described below with reference to FIG. 3.

In operation, the audio oscillator 25 generates a sinusoidal electrical signal having a frequency below 20 kHz and preferably about 1,000 Hz. Frequency is not critical but frequency of oscillations must remain constant during a distance measurement. The electrical signal is transformed into sinusoidal acoustic waves by speaker 23. Acoustic energy is transmitted down conduit 21 to orifice 13. The surface S should be reflective of acoustic waves and non-vibrating so that phase shifts due to acoustic impedance may be measured. The gauge head must be very close, but not touching the surface S; for example, a gap spacing between the gauge head face 14 and surface S may be approximately 50 microns, as indicated by the letter "X".

The phase shift of waves reflected from surface S is detected through the second orifice 31 which communicates with microphone 33. Acoustic waves subjected to acoustic impedance are detected by the microphone 33. In contradistinction to the prior art, the present apparatus is not measuring the amplitude of reflected waves, or the time of arrival of pulse echos.

The acoustic waves which are transmitted to the surface S have a wavelength which is very long compared to the gap spacing, X. For example, for a 1,000 Hz acoustic wave in air at one atmosphere pressure, at 0° C., the velocity of sound is 331.7 meters per second. This means that one wavelength would be 33.17 cm or 331,700 microns. A preferred gap spacing between the face of the gauge head and the surface S of object O is approximately 50 microns. The acoustic path length is therefore approximately 100 microns. Thus, the acoustical path for reflected waves is less than 0.05% of one wavelength. While it may appear impractical to measure distances between a gauge head and the surface of an object which is placed so close the gauge head, measurements of flatness can be ideally performed with such proximity. In flatness measurements, small variations in distance are the object of the measurement. The present invention is directed to measuring distances, and variations in distances, of approximately 1 micron and less and for this purpose, such close spacing is preferred.

The importance of close spacing is twofold. External noise is eliminated, but more importantly, a zone of relatively high acoustic impedance is formed between the acoustic wave orifices and surface S. Acoustic pressure generated by the first orifice works against this acoustic impedance. This zone of high acoustic impedance is believed to cause the phase shifts detected in the present invention. Thus, the spacing of the gauge head must be close enough to surface S to allow acoustic impedances causing linear phase shifts to be formed.

FIG. 2 shows a side view of the gauge head of FIG. 1. The head 11 may be seen to be cylindrical with the first orifice 13 located coaxially within the annular second orifice 31. The first orifice need not be within the second orifice, but may be in a side-by-side relationship or other adjacent location, such that a high acoustic impedance path between the orifices and the surface S may be formed. The relative positions of the first and second orifices may be reversed.

The coaxial geometry of FIG. 2 is preferred because the annular second orifice 31 provides a large aperture for receiving reflected energy while limiting the size of the overall gauge head. Tube 32 which defines second orifice 31 may be part of the gauge head body, such as an inside diameter or may be a separate tube mounted in the gauge head. It is desirable to keep the conduit 21 short in order to avoid any unwanted acoustic impedances. Similarly, the microphone 33 communicates directly with the orifice 31 through tube 32 in order to limit the loss of acoustical signal between the orifice and the microphone.

Figure 3:
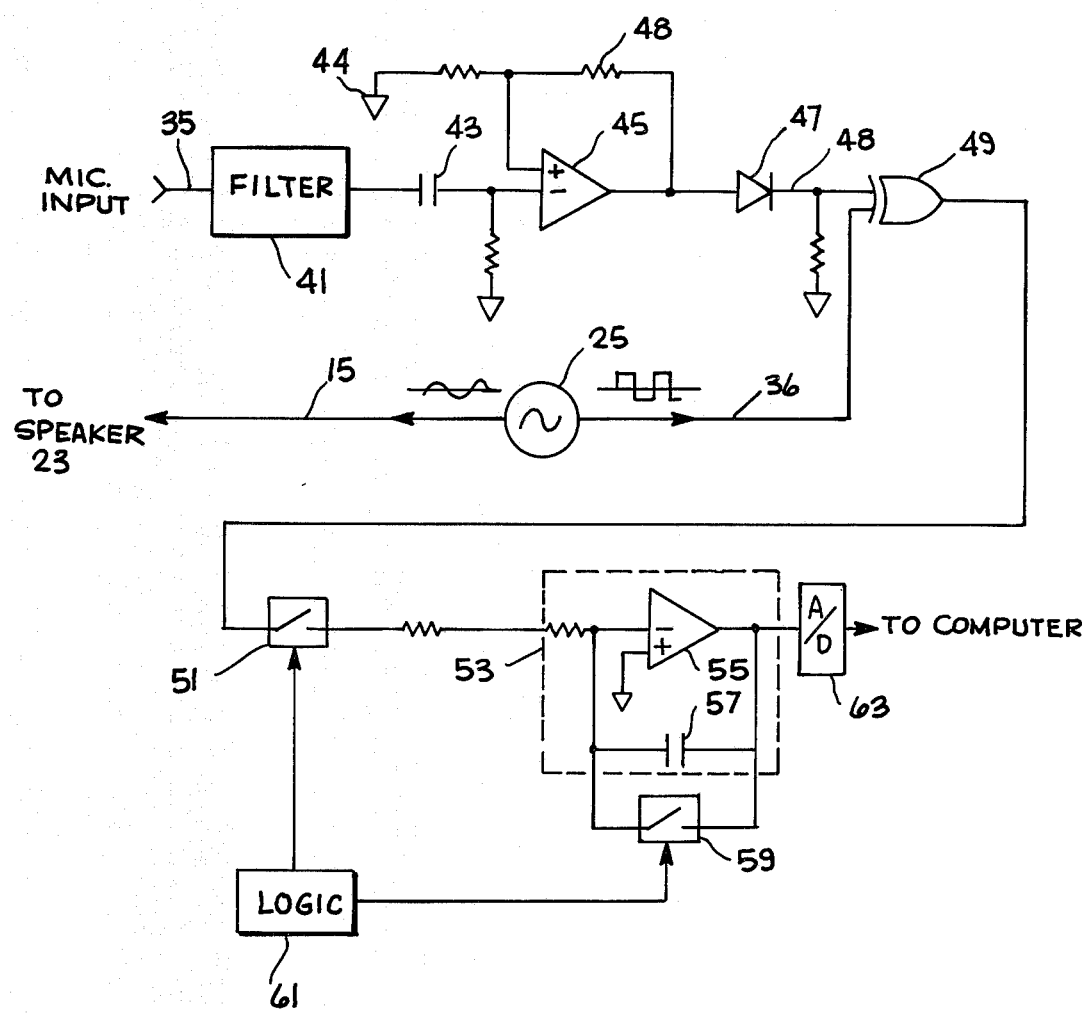
FIG. 3 is a simplified electrical schematic for the signal processing means of the present invention.

While the configuration of the transducer shown in FIGS. 1 and 2 is known, the electrical circuit of the signal processing means which utilizes the transducer, illustrated in FIG. 3, is new. The output of microphone 33, taken along wires 35 forms a microphone input to filter 41 which has a relatively narrow pass band centered at the frequency of oscillator 25. The filter output is fed through capacitor 43 to the negative input of comparator 45 which produces square waves as the filter output voltage travels above and below ground, 44, at the positive input of comparator 45. The square wave output of comparator 45 is fed through the diode 47 to the EXCLUSIVE-OR gate 49, which serves as a phase detector. Part of the output from comparator 45 is fed back to the input through resistor 48 which provides an anti-bounce characteristic known as hysteresis. The amount of hysteresis should be minimal to reduce sensitivity to amplitude changes.

Figure 4:
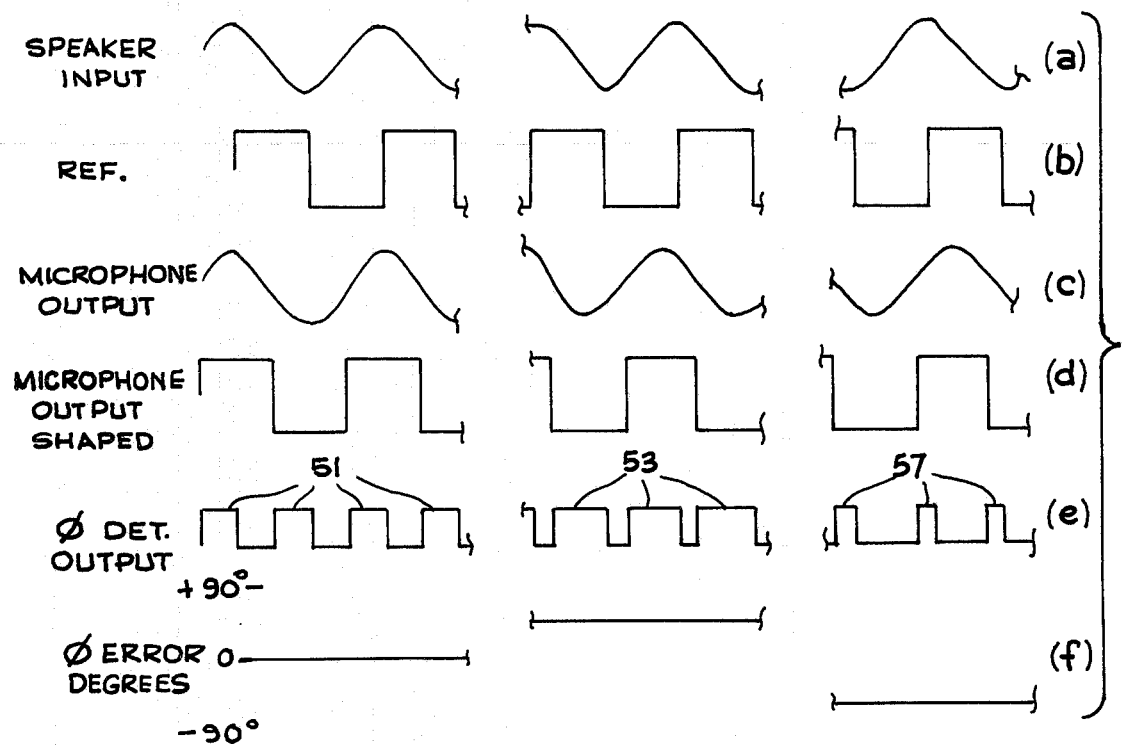
FIGS. 4(a)—(f) are waveforms illustrating operation of the present invention.

The phase detector 49 receives a second input from oscillator 25 along wire 36. This input is a square wave which is shifted 90° relative to the sine wave output transmitted to speaker 23 along wires 15. The sine wave output of oscillator 25 drives speaker 23 with the speaker input waveform being shown in FIG. 4(a). The square wave reference waveform which is shifted in phase by 90° is illustrated in FIG. 4(b). FIG. 4(c) illustrates the waveform which is reflected from the surface S and which becomes the output of microphone 33. This reflected wave is shaped by comparator 45 to have a square wave output as illustrated in FIG. 4(d). The phase detector 49 receives the shaped reflected wave of FIG. 4(d) along wire 48 and the reference waveform illustrated in FIG. 4(b) along wire 36 from oscillator 25. The output waveform of the phase detector 49 is shown in FIG. 4(e) wherein the output pulses have a pulse width which is proportional to the phase error between the speaker input and the reflected wave. For example, the first four pluses of FIG. 5(e), labeled 51 have a 50% duty cycle indicating that there has been no shift between the reference waveform of FIG. 4(b) (which has been shifted by 90° ) relative to the reflected wave of FIG. 4(d).

The next four pulses, labeled 53, have been lengthened by approximately 45° to show a positive phase error of that amount. In FIG. 4(f) the 45° phase error is shown.

The next pulse 55 is similar in width to the pulses 51 and represents zero phase error. The next pulses 57 are narrower in width than pulse 55 and represent a negative phase error of approximately 45°. This is also pictured in FIG. 4(f). A zero phase error corresponds to a distance from the gauge head to an arbitrary distance.

The positive and negative phase errors represent positive and negative changes in distance relative to that reference position. The present invention therefore does not measure distance in the absolute sense, but changes in distance relative to a reference position which is known.

In operation, the distance between the gauge head face and a surface to be measured would be established at a reference distance of about 50 microns apart. Then, as the transducer moved relative to the surface S the changes in distance to the surface from the gauge, relative to the original reference distance could be measured. This requires very careful mechanical control of both the transducer and the surface to be measured. For example, servo mechanisms might be used to control the lateral movement of the transducer relative to the surface so that flatness measurements could be made.

Rather than base the measurement on a single phase error signal, the output of the phase detector is integrated by selecting a number of sample waveforms. The output of phase detector 49 is transmitted through switch 51 to an integrator which is indicated by the dashed line 53. Integrator 53 comprises an operational amplifier 55 with a capacitor 57 connected across it. A switch 59 is used to reset the integrator after an integration. A logic circuit 61 is used to count a predetermined number of pulses through switch 51 which determines the sampling interval, and then resets the integrator 53 by means of switch 59. For example, it may be desirable to integrate over 30 phase error pulses to obtain a statistically reliable phase error sample signal. This pulse count number is preset in logic 61 which then counts pulses through switch 51 and after the preset number of pulses has passed through the switch, opens switch 51 thereby stopping further pulses from entering capacitor 57 and resets integrator 53 by closing switch 59. After the integrator has been reset, switch 51 is closed for the next measurement. The output of integrator 53 is transmitted to an analog-to-digital converter 63 so that the integrated output signal may be processed by a computer.

Figure 5:
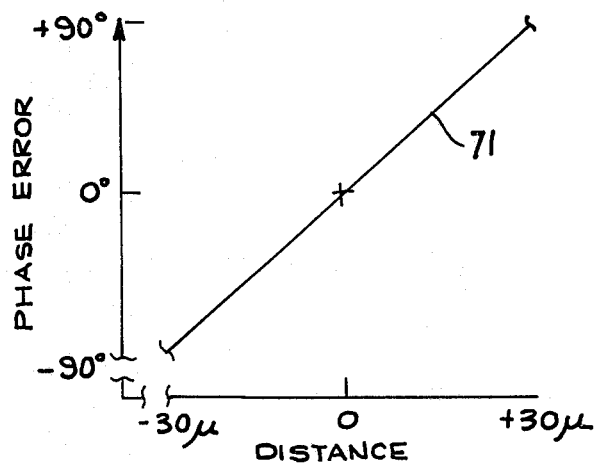
FIG. 5 is a plot of distance versus phase error.

The integrated phase shift output of the circuit of FIG. 3 is plotted against relative distance from a reference in FIG. 5. The mid point of the abscissa is the zero reference distance, while positive and negative distances, in microns, are shown to the right and left of the zero point. The phase error in degrees is plotted as the ordinate, extending from a negative 90° upwards to a positive 90°. Over this range, there is an unambigious linear relationship between phase error and distance. It will be noted that in the lower left hand corner of the plot the linear relationship, expressed by the generally straight line 71 is broken. This indicates that beyond the broken line 71, the relationship between phase error and distance is not necessarily linear. Similarly, in the upper right hand corner of FIG. 5 the line 71 is also broken. Again, the relationship between phase shift and distance beyond the point indicated may not be linear. If the shape of the curve is known, a plot, similar to FIG. 5 may be stored in a digital computer and phase relationships may be correlated with distance in accord with the shape of the curve. However, we have discovered a linear relationship which is particularly easy to deal with, but this linear relationship exists for the transducer of FIGS. 1 and 2 for very limited distances and only when the transducer is spaced very close to the surface of the object being measured.

The apparatus of the present invention is particularly useful for measuring flatness of optical surfaces, semiconductor wafers and other web-like materials having a generally planar surface which is reflective of acoustic waves.

We claim:

1. A gauge for measuring a change in the relative distance of a surface from an acoustic emission orifice of the gauge comprising,
   an electrical oscillator producing an audio frequency electrical signal and driving an acoustic wave source producing waves having a wavelength which is very long compared to the distance between a first orifice emitting acoustic waves and a surface, changes to which are to be measured,
   a gauge head having said first orifice therein open toward said surface for emitting ecoustic waves, and a second orifice therein open toward said surface proximate to the first orifice, said gauge head closely spaced relative to the surface at a distance, changes to which are to be measured, whereby a relatively high acoustic impedance is formed between the gauge head and the surface, said first orifice communicating with the acoustic wave source, the wavelength of said waves being independent of dimensions of said gauge head,
   acoustic wave detection means communicting with the second orifice in said gauge head, said detection means producing a detector electrical signal representing detected acoustic waves, and
   phase detection means connected to receive said oscillator audio frequency electrical signal and detector electrical signals, for producing a distance variation signal from the phase difference therebetween.

2. The gauge of claim 1 wherein said first orifice is defined at an end of a first tube, and said second orifice is defined at an end of a seocnd tube, said first and second tubes terminating at said head.

3. The gauge of claim 2 wherein said first tube is coaxially disposed within said second tube.

4. The gauge of claim 1 wherein said acoustic wave source is a speaker.

5. The gauge of claim 1 wherein said acoustic wave detection means is a microphone.

6. A method for measuring variations in distance from an acoustic source and detector to a surface comprising,
   generating continuous acoustic energy out of a first orifice in a first acoustic conduit open toward a surface, changes to which are to be measured, said energy from an acoustic wave source having a wavelength which is very long compared to the distance variations being measured, said source having a reference phase electrical signal, siad first orifice and surface disposed in close proximity forming a zone of high acoustic impedance such that the phase of acoustic waves is shifted due to such inpedance,
   simultaneously receiving acoustic waves subject to said acoustic impedance through a second orifice in another acoustic conduit distinct from said first acoustic conduit and open toward the surface at a position adjacent to the first orifice and converting said waves into a phase shifted electrical signal, the wavelength of said acoustic waves being independent of dimensions of said acoustic conduits, and detecting the extent of phase shift of said phase shifted electrical signal relative to said reference phase electrical signal, whereby said extent of phase shift is indicative of variations in distance between said acoustic source and said surface in accord with a known relation.

7. A gauge for measuring very small distance variations in a gap between a surface reflective of acoustic waves and an acoustic emission orifice of the gauge comprising, means for producing acoustic waves having a wavelength which is very long compared to a gap distance, changes in which are to be measured, first and second adjacent tubes, each tube having a first orifice at a first tube end open to said surface reflective of acoustic waves and a second orifice associated with an end of each tube opposite the first end, the second orifice of the first tube communicating with said means for producing acoustic waves in an orientation such that the first orifice of the first tube emits acoustic waves toward said reflective surface at a distance sufficiently close that an acoustic impedance zone is established, the wavelength of said acoustic waves being independent of dimensions of said tubes, acoustic wave detection means communication with the second orifice of the second tube, said detection means producing a detector electrical signal representing detected acoustic waves, and phase detection means connected to receive said detector electrical signal and a signal from the oscillator means for producing a distance variation signal from the phase difference therebetween.

8. A gauge for measuring very small distance variations in a gap between a surface reflective of acoustic waves and an acoustic emission orifice of the gauge comprising, an electrical oscillator producing an audio frequency electrical signal and driving an acoustic wave source producing waves having a wavelength which is very long compared to a gap distance, changes in which are to be measured, first and second adjacent tubes, each tube having a first orifice at a first tube end open to said surface reflective of acoustic waves and a second orifice associated with an end of each tube opposite the first end, the second orifice of the first tube communicating with said acoustic wave source in an orientation such that the first orifice of the first tube emits acoustic waves toward said reflective surface at a distance sufficiently close that an acoustic impedance zone is established, the wavelength of said acoustic waves being independent of dimensions of said tubes, acoustic wave detection means communicating with the second orifice of the second tube, said detection means producing a detector electrical signal representing detected acoustic waves, and phase detection means connected to receive said oscillator audio frequency electrical signal and detector electrical signal for producing a distance variation signal from the phase difference therebetween.

* * * * *